(12) United States Patent
James

(10) Patent No.: US 8,164,474 B2
(45) Date of Patent: *Apr. 24, 2012

(54) INTELLIGENT PATCHING INFASTRUCTURE MANAGEMENT SYSTEM

(75) Inventor: Jason Lee James, Northampton (GB)

(73) Assignee: Hellermanntyton Data Limited, Northampton (GB)

( * ) Notice: Subject to any disclaimer, the term of this patent is extended or adjusted under 35 U.S.C. 154(b) by 182 days.

This patent is subject to a terminal disclaimer.

(21) Appl. No.: 12/113,743

(22) Filed: May 1, 2008

(65) Prior Publication Data

US 2008/0266063 A1 Oct. 30, 2008

Related U.S. Application Data

(63) Continuation of application No. PCT/GB2006/003987, filed on Oct. 26, 2006.

(30) Foreign Application Priority Data

Nov. 1, 2005 (GB) .................................. 0522300.3

(51) Int. Cl.
*G08B 21/00* (2006.01)
*G08B 5/22* (2006.01)
*G08B 9/00* (2006.01)
*G01R 19/00* (2006.01)
*H01R 3/00* (2006.01)

(52) U.S. Cl. ................... 340/687; 340/657; 340/815.45; 340/286.02; 324/66; 439/515

(58) Field of Classification Search .................. 340/687, 340/686.1, 540, 500, 286.02, 815.45; 439/490
See application file for complete search history.

(56) References Cited

U.S. PATENT DOCUMENTS 4,672,663 A * 6/1987 Tomasi .................... 379/388.01
5,394,503 A * 2/1995 Dietz et al. .................... 385/135
(Continued)

FOREIGN PATENT DOCUMENTS

GB 2406447 A 9/2003
GB 2406447 A * 3/2005

OTHER PUBLICATIONS

International Search Report for PCTGB2006/003987.

(Continued)

*Primary Examiner* — George Bugg
*Assistant Examiner* — Jack Wang
(74) *Attorney, Agent, or Firm* — Brinks Hofer Gilson & Lione

(57) ABSTRACT

A connection management system comprises a plurality of sockets 1, 2 for receiving complement plugs provided on ends of cables for effecting interconnections between said sockets. Each said socket 1, 2 has an input contact 1a, 2a and an output contact 1b, 2b being electrically connected upon inserting a plug A, B into the socket 1, 2 so as to transmit the logic state. Detection of a change of said logic state at said other of said input 1a, 2a and output 1b, 2b terminals is then indicative of the presence of a plug A, B therein. A signal is then provided to one of the input and output contacts of a socket 1, 2 and the other of said input and output contacts is then monitored for the presence of said signal in order to confirm the presence of a plug A, B in the socket 1, 2.

18 Claims, 5 Drawing Sheets

U.S. PATENT DOCUMENTS

| | | | |
|---|---|---|---|
| 6,790,097 B1* | 9/2004 | Edwards et al. | 439/676 |
| 6,900,629 B2* | 5/2005 | Hwang et al. | 324/66 |
| 7,049,937 B1* | 5/2006 | Zweig et al. | 340/657 |
| 2003/0222786 A1* | 12/2003 | Dannenmann et al. | 340/815.45 |
| 2004/0219827 A1* | 11/2004 | David et al. | 439/515 |
| 2006/0232385 A1* | 10/2006 | Scherer et al. | 340/286.02 |

OTHER PUBLICATIONS

International Preliminary Examination Report for PCT/GB2006/003987.

British Search Report for Application No. GB0621312.8.

* cited by examiner

INTELLIGENT PATCHING INFASTRUCTURE MANAGEMENT SYSTEM

CROSS-REFERENCE TO RELATED APPLICATIONS

This application is a continuation of International Application No. PCT/GB2006/003987 filed on Oct. 26, 2006, which claims the benefit of GB0522300.3, filed Nov. 1, 2005. The disclosures of the above applications are incorporated herein by reference.

FIELD

The present invention relates to systems for monitoring and recording interconnections within an array of sockets, in particular within patch panels such as those used in communications rooms for communications networks.

BACKGROUND

The statements in this section merely provide background information related to the present disclosure and may not constitute prior art.

Intelligent patching systems are known in which a centralised analyser is used that is connected through a multitude of wires to each of the output ports and each of the input ports on each of the patch panels, an example of which is illustrated in FIG. 3. The analyser switches the output high and then low for each port in turn. After switching the port high the analyser checks to see if any of the other ports are high. If they are then a connection has been discovered. If not then no connection exists. The system has the drawback, however, that it requires both ends of the cord to be in place before the analyser becomes aware of the cord, as it is only the detection at the remote end that identifies the presence of a patch cord.

SUMMARY

According to the present disclosure there is provided a connection management system comprising a plurality of sockets for receiving complementary plugs provided on ends of cables for effecting interconnections between said sockets, each said socket having an input contact and an output contact, each of which are connected to a controller operable to control and monitor individually the logic state of said contacts, said input and output contacts of a socket being electrically connected upon inserting a plug into the socket so as to transmit the logic state from one of the input and output contacts to the other of said input and output contacts, detection of a change of said logic state at said other of said input and output contacts being indicative of the presence of a plug therein.

In one form, the system further includes indicator means operable by the controller to identify each socket. In a further development, each said cable includes a tracer wire which extends between contacts on the plugs on opposing ends of the cable so as to effect an electrical connection therebetween, whereby the logic state of one of the input and output contacts of a socket into which the plug on one end of the cable is plugged is transmitted by said tracer wire to one of the input and output contacts of a socket into which the plug on the other end of the cable is plugged, said controller detecting a change in the logic state of said one of the input and output contacts in order to identify the socket into which said other end of said cable is connected.

In one form, the input and output contacts of the socket are located internally of the socket, in particular being formed by a shielding can which extends around the inside of the socket and is separated into two parts which are electrically isolated from each other.

The present disclosure further provides a method of detecting the presence of a plug in a socket and detecting the interconnection between sockets comprising the steps of providing a connection management system according to the invention, providing a signal to one of the input and output contacts of a socket and monitoring the other of said input and output contacts for the presence of said signal in order to confirm the presence of a plug in the socket.

The present disclosure further preferably includes the step of, once the presence of a plug in one socket has been confirmed, providing a signal only to one of said input and output contacts (preferably the output contacts) of said one socket in which the plug is inserted, and monitoring the input and output contacts of other sockets for said signal, the presence of the signal on one of said contacts on another socket being indicative that the plug on the other end of the cable whose first end in inserted into said one socket is inserted into said another socket.

The present disclosure still further provides a method of identifying to a user a connection pattern for interconnecting a plurality of sockets using a plurality of cables, comprising the steps of providing a connection management system according to the invention which further includes indicator means operable by the controller to identify each socket, programming the controller with a desired connection pattern, and activating the controller, whereupon the controller identifies the sequence in which the sockets should be connected by activating the indicator means associated with the sockets into which the user should insert the plug of a cable, the controller monitoring the sockets for signals confirming that the user has correctly interconnected the sockets.

The present disclosure in one form uses a modified modular socket and a modular plug, for example a modified shielded RJ45 jack and a standard complementary RJ45 plug, to detect the insertion and removal of a patch cord into a structured cabling system, and a drain-wire of the shielded patch cord to locate the position of the second end of a cable, the first end of which is detected to be plugged into a socket. The plug and socket could also take other forms such as fibre optic coupling systems. Furthermore, shielded modular plugs and an unshielded patch cable with an additional $9^{th}$-wire in the cable could be used as the tracing element for locating the remote end of a cable.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

In order that the disclosure may be well understood, there will now be described various forms thereof, given by way of example, reference being made to the accompanying drawing, in which.

DETAILED DESCRIPTION

The following description is merely exemplary in nature and is not intended to limit the present disclosure, application, or uses.

Figure 1:
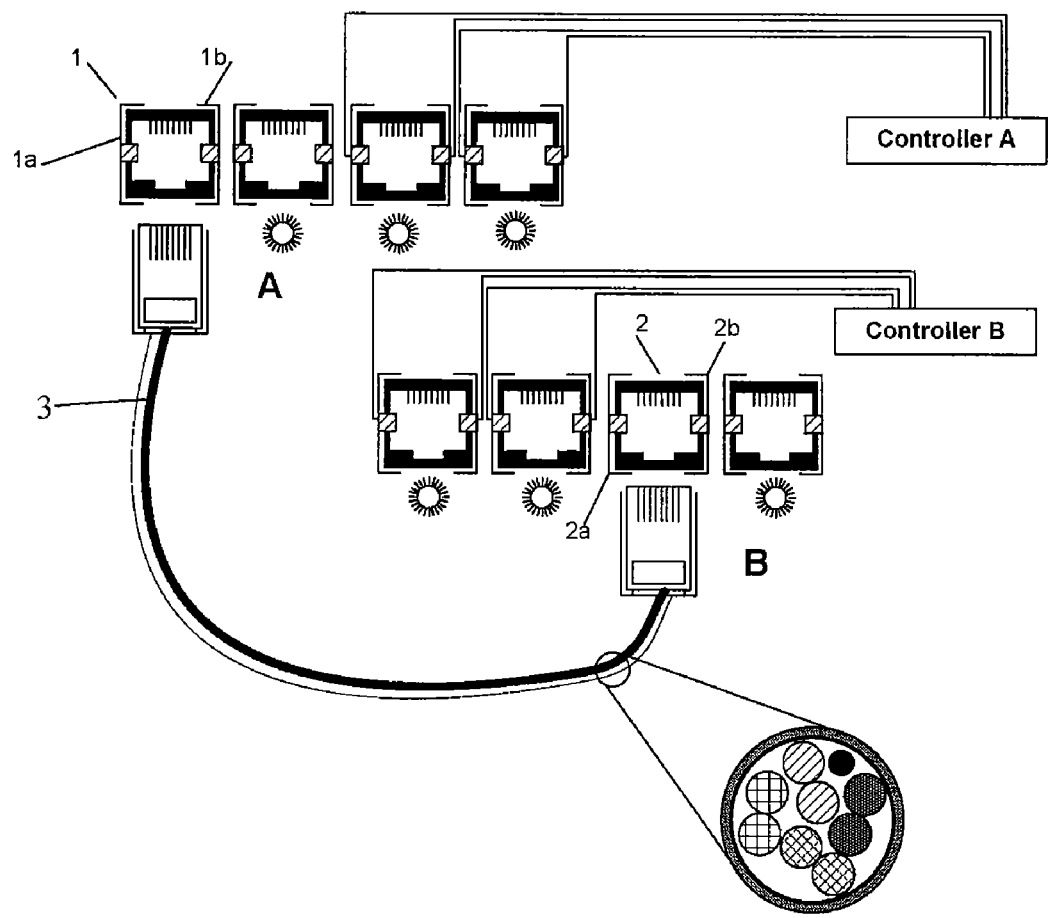
FIG. 1 is a diagrammatic representation of a patch connection according to the present disclosure.
Figure 2:
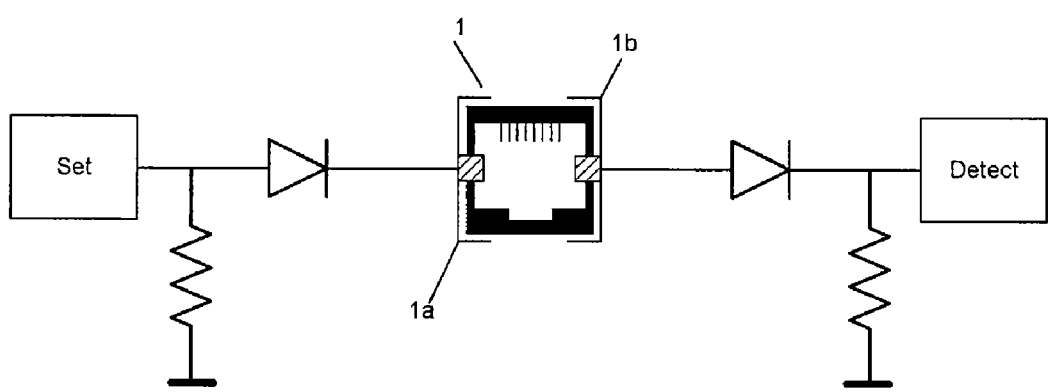
FIG. 2 is a diagrammatic representation of a modified jack socket according to the disclosure.
Figure 3:
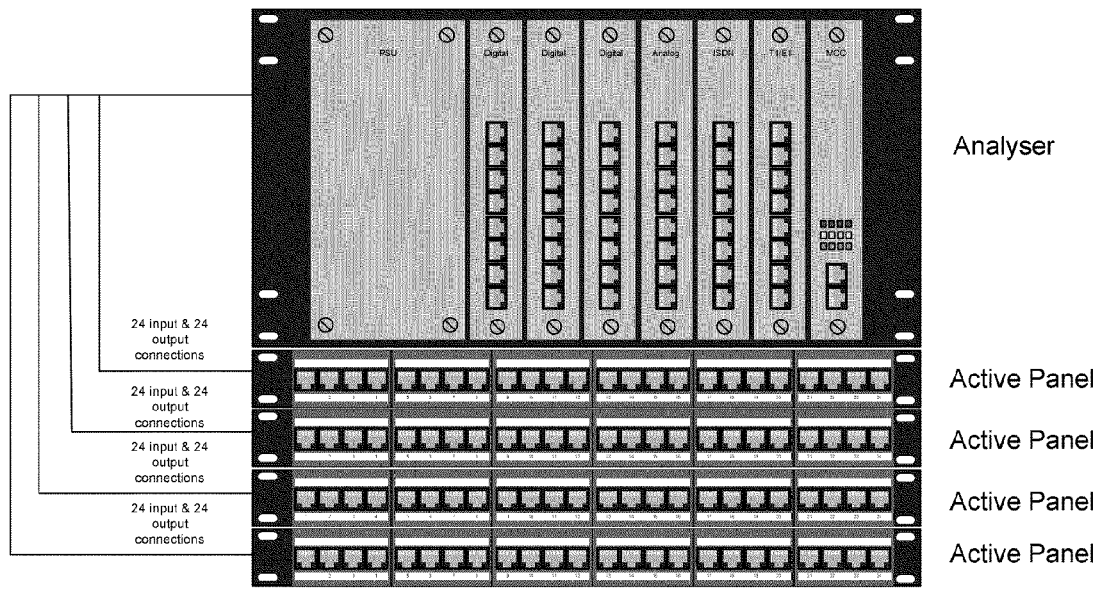
FIG. 3 is a diagrammatic representation of an analyser which operates the system of the present disclosure.
Figure 4:
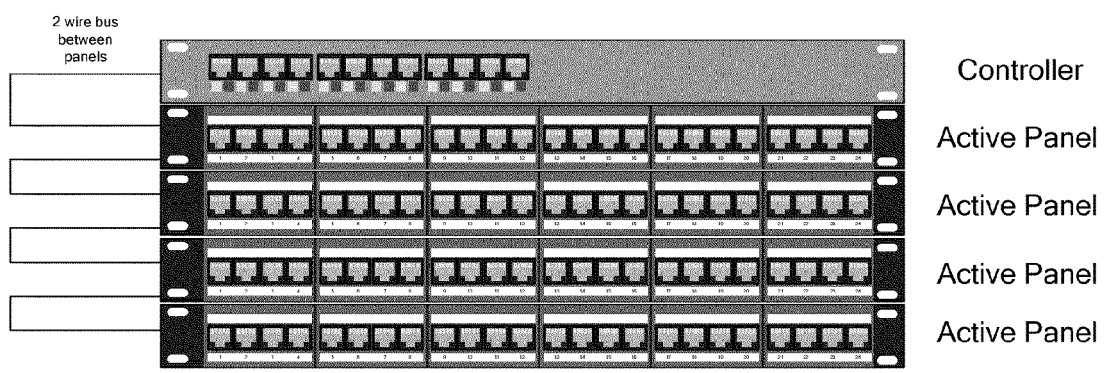
FIG. 4 is a diagrammatic representation of a controller which forms part of the system of the present disclosure.
Figure 5:
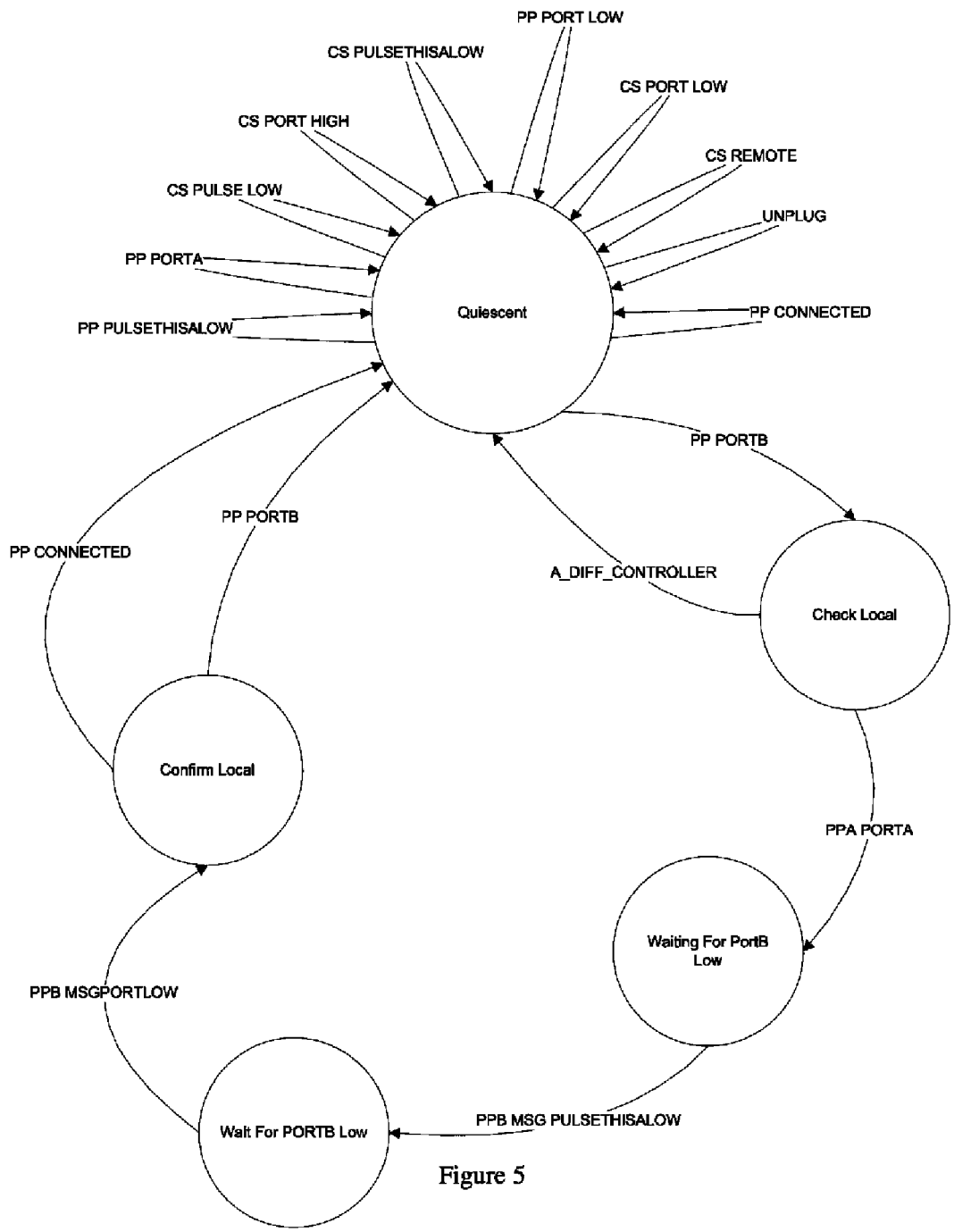
FIG. 5 is a flow chart illustrating the logic underlying the operation of a closet controller of the disclosure.
Figure 6:
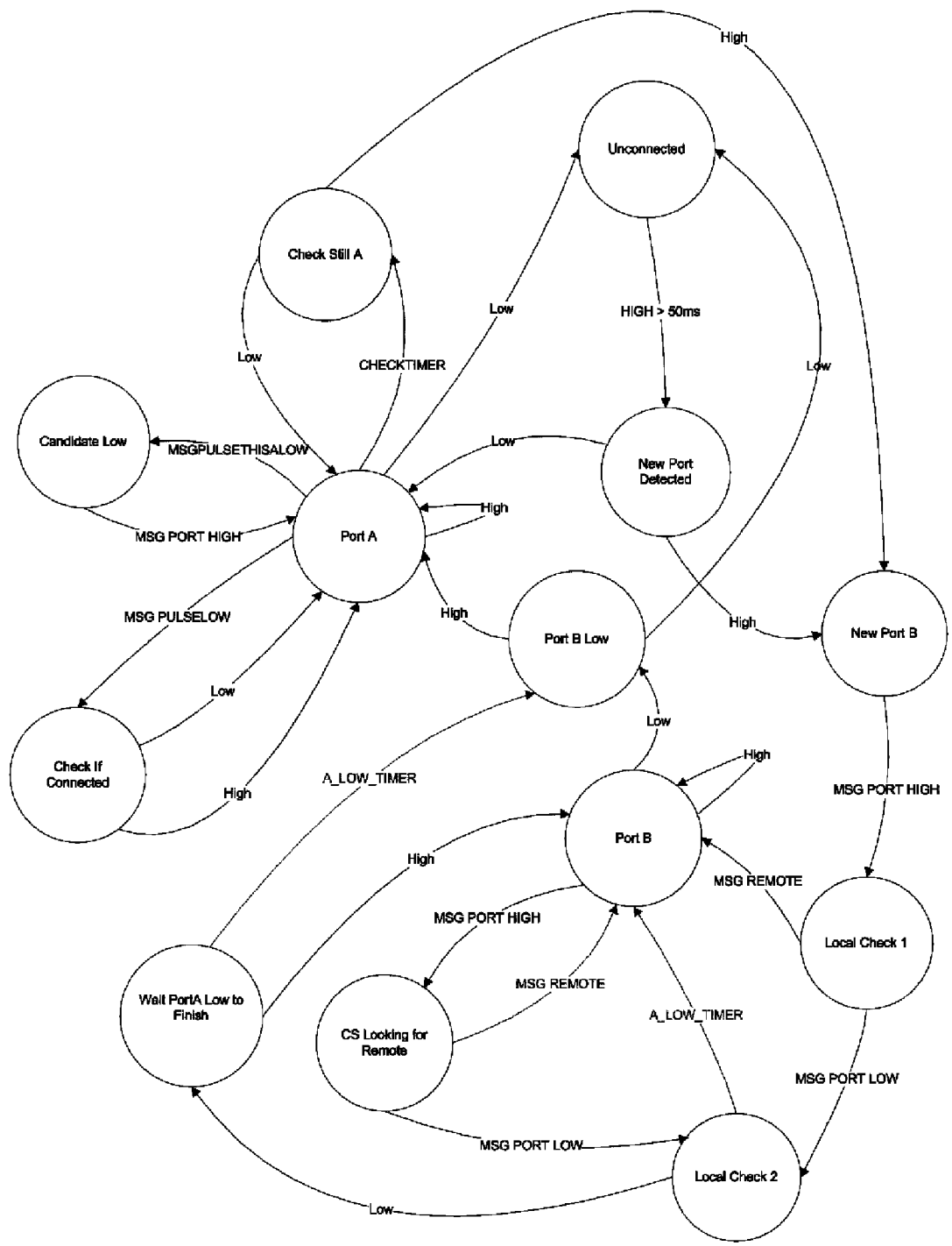
FIG. 6 is a flow chart illustrating the logic underlying the operation of a smart patch panel of the disclosure.
Figure 7:
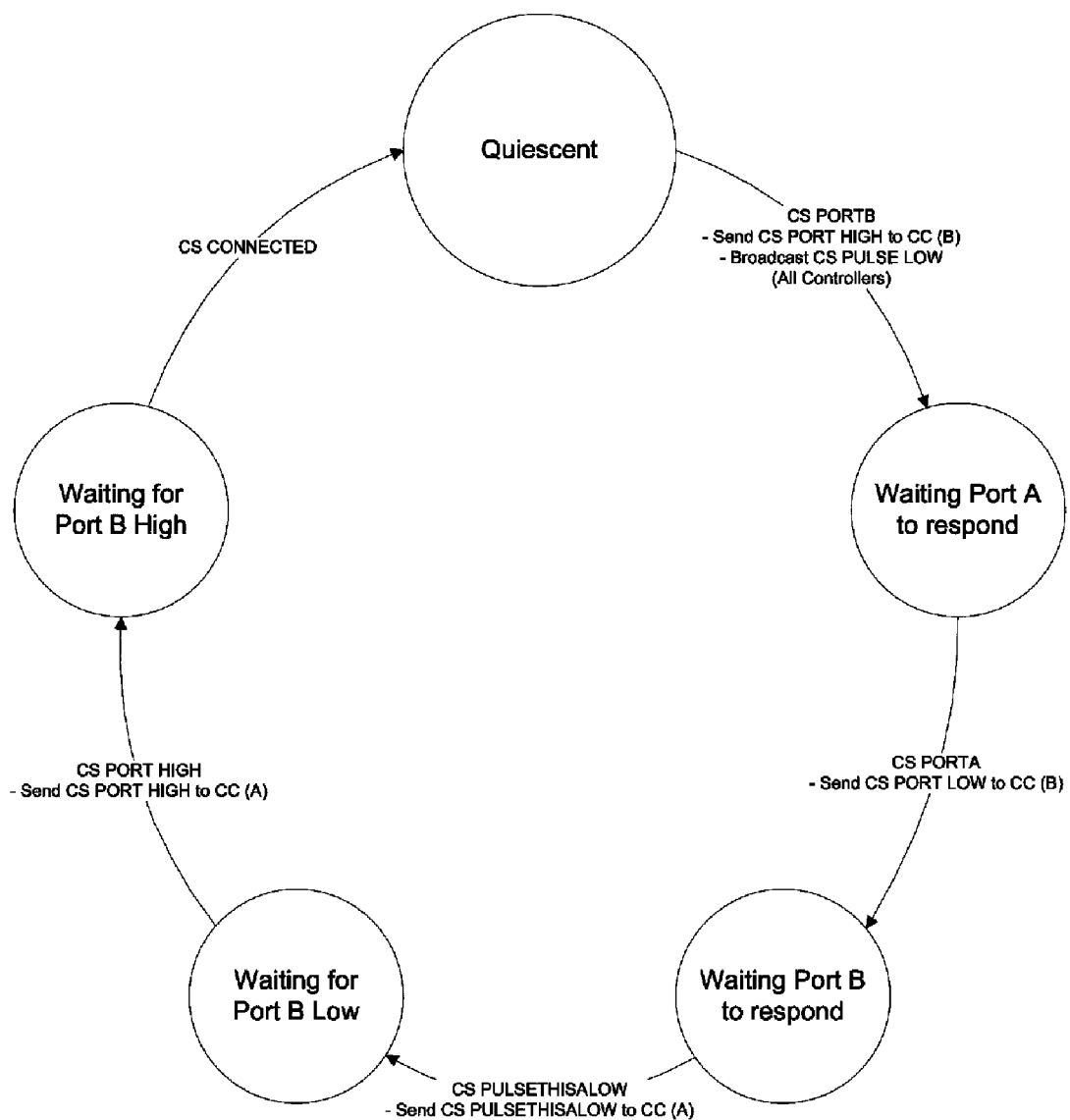
FIG. 7 is a flow chart illustrating the logic underlying the operation of a system controller of the disclosure.

The present disclosure uses a modified modular jack and a modular plug, in particular but not exclusively a modified RJ45 jack A, B and a standard RJ45 socket 1, 2 to detect the insertion and removal of a patch cord 3 or the like into a structured cabling system, and the drain-wire of the shielded patch cord to locate the position of the end remote (B) to the first cord (A) insertion as illustrated in FIGS. 1 and 2. This could be similarly achieved by the use of shielded modular plugs and unshielded patch cable with an dedicated $9^{th}$-wire in the cable as the tracing element, such as a $9^{th}$ wire incorporated into a standard 8 wire category 5 enhanced or category 6 patch cable.

Each said socket 1, 2 has an input contact 1a, 2a and an output contact 1b, 2b which are connected to a controller operable to control and monitor individually the logic state of said contacts. Indicator means such as an LED (not shown) is associated with each socket 1, 2 and is operable by the controller to identify the socket.

The action of inserting the first end A of the cord 3 into the socket 1 will short circuit the modified modular jack can, connecting the two contacts 1a, 1b. This short circuit is detected by the detection circuitry that is in the patch panel. This end is tested to ensure that it is an A end of the patch cord.

When the remote end of the patch cord (B) is inserted into its modular jack 2, the modified shield can is also short circuited, connecting the two contacts 2a, 2b and this too is detected by the detection circuitry.

To allow the removal of the cord (or the cutting of the cord) to be detected at any point in time, the A end Set condition is held at logic level 1. This is detected on the A end Detect circuit. The B end Set condition is held at a logic level 0. However, the B end Detect pin is maintained at a logic level 1 by the high logic level of the A end Set condition which is transmitted through the cable 3. Removal of the cord from the B end will drop the logic level on the Detect pin on the B end only to 0, whereas removal of the cord from the A end will drop the logic level on the Detect pin on the A and B ends to 0.

The establishing and removal of a logic level on a particular modular jack port, and the detection of the connection between the A and B ends of the patch cord are determined by the connected electronic circuitry, which is attached to a central computer that writes the port and patching records to a centralised database.

The difference with the present disclosure is that the cord's presence is known as soon as the first end of the cord is inserted. The circuit that is completed when the first modular plug is inserted is detected by the panel based controller (note the competition has a central analyser whereas the present invention is distributed). This happens in the absence of the second end of the cord being inserted. When the second end is inserted, it is the closing of the modular jack circuit that is used to detect the presence of the cord, not the signal coming from the remote socket.

The process of determining the location of a patch cord in a patching frame is addressed in several existing infrastructure management systems. However, the existing solutions to the problem use one of several techniques that are different to the present invention.

Some solutions use an optical tracer in the patch cord that when illuminated from one end will shine at the other, and therefore its location can be determined. The drawback with this solution is there is no interface to a database system that retains the configuration information.

Another solution uses the sequence that the cords are inserted into the patching frame to determine which two ports in the frame are connected together. The first plug identifies one end and the second inserted plug identifies the second end. Getting out of sequence with this type of solution will cause the database records to be stored in error and they will take a long time to rectify.

Yet another solution uses a single tracer wire along the length of the patch cord to allow an analyser to locate the remote end of the patch cord. Whilst this solution may seem to solve all the problems listed above, including the facility of attaching the analysers to a database, there are still some problems with it. The patch cord must be inserted into the patch panel at both ends before the cord can be identified and located. This type of solution also uses proprietary cords, and the user can choose to use standard cords, once again confusing the system and missing all important patching records. Since both ends of the cord must be detected by the analyser circuitry prior to the location of the cord being identified, all equipment must be fitted with analyser circuitry. The present disclosure can detect single plug insertions and as such non-analyser detecting equipment can also be managed using simple barcodes.

The present disclosure uses a pair of contacts at each modular jack position and a trace wire along the length of the cord so that the location of the remote end can be determined. Whilst the physical mechanism of determining the location of the ends of a patch cord is an important part of the solution, the process of determining the location of the connections, and managing the connections is equally important. The decision to include a pair of contacts at each patching position allows the monitoring system to determine when the first end of the patch cord is inserted, which in turn makes the location of the remote end easier to determine.

The present disclosure detects single end connections and this information is recorded in the database. At any point in the future this circuit could be completed with the B end being inserted into a modular jack position and a connection would then be recorded. This connection is however not essential as the remote end of the cord can be managed using simple barcodes.

The topology of the system consists of an output and an input contact for each monitored jack port. Each of the pair of contacts are connected to a local (panel based) controller that determines the state of the contacts, processes which end of the patch cord has been inserted and communicates the state of each port. The panel controller also controls the optical indicators associated with each modular jack. These optical indicators can be single or multiple colours and either monostable or astable in state. The panel controllers communicate with a closet controller along a CAN (Controller Area Network) bus. Multiple panel controllers can be attached to a single CAN bus. A large installation may contain numerous closet controllers; each with their own panel controllers connected to their own CAN bus. The closet controllers are connected to the system controller and database over a LAN or WAN connection. Multiple closet controllers share a common ground connection when inter-closet patching may occur.

On power up all of the output contacts are set to a high condition. The input contacts are held low and continuously monitored for the high condition present on the output contact. When a change in state in determined on one of the contacts, the logic in the panel controller determines whether this is the first end of the cord to be inserted (the 'A' end) or the second end of the cord to be inserted (the 'B' end).

There is no difference between the two ends of the cord. The 'A' end refers to the end of the cord that was inserted first, and the 'B' end refers to the end of the cord that was inserted second.

The panel controller forces the output contact of the detected port low and reads back the input contact. If the read back value is low then the patched port is determined to contain the 'A' end of the patch cord. This port 'A' is communicated to the local closet controller and the system controller and database.

Determining the location of a 'B' end is conducted similarly. However, in the case of a 'B' end the forcing of the output contact low has no effect as a high value is detected from the corresponding 'A' end.

It is the location of the 'A' end that corresponds to the detection of the 'B' end that consumes most of the processing power of the panel controller. The 'A' end that corresponds to the detected 'B' end may reside in the same closet controller or it may reside in a panel connected to a different closet controller. The process of determining the location of the 'B' end of the cord is however identical, irrespective of where it is. The only additional steps are the inclusion of the system controller to relay messages from one closet controller to another.

To locate the whereabouts of the 'A' end once a 'B' end has been found uses the following logic.

Once the 'B' end is located, it is forced high. Once it is at a high level all known 'A' ends within the same closet controller are pulsed to a low logic level for a few milliseconds. This short duration is to ensure that any 'B' ends already connected to 'A' ends are not disconnected. The 'A' end that is connected to the 'B' end will be held high by the high level at the 'B' end. This high level will be located in one of the panel controllers and communicated to the closet controller. Once the 'A' end has been located in is checked to make sure that it is correct. The connection is checked by forcing the 'B' end low again and pulsing the single 'A' end high. This high level will be detected by the panel controller, which in turn will be communicated to the closet controller. The state of the port is incremented as the process unfolds until it reaches a state of connected. Once this state has been reached a connected message is communicated to the closet controller, which in turn communicates the connected message to the system controller.

Once the initial 'A' and 'B' ends are located, they are communicated to the panel controllers during each command to preserve a stateless model of the panel and closet controllers.

If the 'A' end can not be located in the same closet controller as the 'B' end then messages are sent to the system controller that instructs all 'A' ends in all other closet controllers to be pulsed low. This is a secondary operation, as most patch cords will connect ports contained in the same closet controller system.

The logic contained in the panel controller is also capable of understanding what to do when a cord is removed from a patch panel port. If an 'A' end is removed the port is set to unconnected, and the corresponding 'B' end (assuming that the 'B' end of the cord has been inserted) to promoted to an 'A' end. If a 'B' end is unplugged then the port to set to unconnected.

Similar processes are contained in the system controller to manage the actions of the user when instructing them to patch two particular ports together. The visual indicators associated with each of the ports are driven by the system controller to lead the operator to the ports that require connecting. Failure to complete the requested operation will be identified by the system controller and the operator will be stepped through making the necessary changes to rectify to miss-patched cord. Alternatively, the operator can override this request and have the system controller accept this new patching information.

The system is capable of performing a complete system scan after power-up or at any other time to audit its internal database against the actual configuration of the patching field. Temporary or non-committed records are generated and once confirmed are written permanently to the database.

Each closet controller has a unique IP address to allow the system controller to communicate with them individually. The messaging from the system controller to the closet controller and the closet controller to the panel controller contains the destination addressing information.

The panel controllers are added to the CAN bus after power up and assigned individual identification number so that the closet controller can communicate with each of them uniquely.

The closet controller maintains a non-volatile list of all attached panel controllers to ensure prompt recommencement of monitoring after a power failure.

It should be noted that the disclosure is not limited to the embodiment described and illustrated as examples. A large variety of modifications have been described and more are part of the knowledge of the person skilled in the art. These and further modifications as well as any replacement by technical equivalents may be added to the description and figures, without leaving the scope of the protection of the disclosure and of the present patent.

What is claimed is:

1. A connection management system comprising:
    a plurality of sockets for receiving complementary plugs provided on ends of cables for effecting interconnections between said sockets, each said socket having an input contact and an output contact, the input and output contacts being located internally of each of the sockets;
    a local controller that controls and monitors individually a logic state of said contacts in each of the sockets, the local controller detecting a change of the logic state when said input and output contacts of a socket are electrically connected by a plug that is inserted into the socket, detection of a change of said logic state being indicative of the presence of a plug therein, and wherein each said cable includes a tracer wire which extends between contacts on the plugs on opposing ends of the cable so as to effect an electrical connection therebetween; and
    a central controller that monitors the electrical connection between the contacts on the plugs on opposing ends of the cable by the tracer wire.

2. The connection management system according to claim 1, further including indicator means operable by the controller to identify each socket.

3. The connection management system according to claim 1, wherein the tracer wire is a dedicated wire which is connected between the plugs on ends of the cable.

4. The connection management system according to claim 1, wherein each socket is a modified socket and each plug is a standard plug having a metal case which connects the contacts of each socket so as create a short circuit therebetween.

5. The connection management system according to claim 4, wherein each socket is a modified modular RJ45 socket and each plug is a standard modular RJ45 plug having a metal can.

6. The connection management system according to claim 5, wherein the plugs are connected by cables having eight wires twisted in four pairs plus an additional wire which interconnects the metal cans for transmitting the detection signal therebetween.

7. A method of detecting the presence of a plug in a socket and detecting the interconnection between sockets comprising the steps of providing a connection management system according to claim 1, providing a signal to one of the input and output contacts of a socket and monitoring the other of said input and output contacts for the presence of said signal in order to confirm the presence of a plug in the socket.

8. The method according to claim 7, including the further step of, once the presence of a plug in one socket has been confirmed, providing a signal only to one of said input and output contacts of said one socket in which the plug is inserted, and monitoring the input and output contacts of other sockets for said signal, the presence of the signal on one of said contacts on another socket being indicative that the plug on the other end of the cable whose first end in inserted into said one socket is inserted into said another socket.

9. The method according to claim 8, wherein the output contact of each socket is initially set to a high condition whilst the input contact of each socket is held low, the status of each input contact continuously being monitored for the presence of the high condition set to the output contact.

10. The method according to claim 9, comprising the further step of ascertaining whether a detected connection is the first end of a cable being inserted into the system or the second end of the cable by means of, upon detecting a change in state on one of the contacts of a socket, the controller setting the output contact of said socket to a low condition and reading the status of the input contact of the identified socket, detection of a low condition on the input contact indicating it is the first end of the cable to be inserted and detection of a high condition on the input contact indicating it is the second end of the cable to be inserted.

11. The method according to claim 10, comprising the further step of identifying the location of the first end of a cable upon detecting insertion of the second end by forcing the identified second end of the cable to a high condition and setting all known first ends to a low condition, detection of a low condition on one of said first ends indicating that it is connected to said identified second end.

12. The method according to claim 10 comprising the further step of scanning all sockets at least periodically to confirm that all previously detected connections are still valid.

13. The method according to claim 12, wherein, upon detecting that a previously detected connection is no longer valid, the recorded other end for that connection is checked to confirm a plug is still inserted into the socket, and if so confirmed, said other end is recorded as a first end.

14. The method according to claim 7, comprising the further step of performing a scan of all sockets upon initialisation of the controller in order to identify all sockets in which a plug is already inserted by checking for continuity between the input and output contacts of each socket.

15. The method according to claim 14, comprising the further step of checking each socket identified as having a plug already inserted by the initialisation scan to identify where the cable connected thereto is also connected to another socket, and logging the other socket, if any, to which said socket is connected.

16. A method of identifying to a user a connection pattern for interconnecting a plurality of sockets using a plurality of cables, comprising the steps of providing a connection management system according to claim 1 which further includes indicator means operable by the controller to identify each socket, programming the controller with a desired connection pattern, and activating the controller, whereupon the controller identifies the sequence in which the sockets should be connected by activating the indicator means associated with the sockets into which the user should insert the plug of a cable, the controller monitoring the sockets for signals confirming that the user has correctly interconnected the sockets.

17. The method according to claim 16, wherein the controller identifies one socket at a time, in each case identifying a socket in which a first end of a cable should be inserted immediately followed by the socket in which the second end of the same cable should be inserted.

18. The method according to claim 16, wherein the controller identifies a pair of sockets at a time between which the user should interconnect a cable.

* * * * *